United States Patent [19]
Honda et al.

[11] Patent Number: 5,189,661
[45] Date of Patent: Feb. 23, 1993

[54] CARD CARRIER

[75] Inventors: Tetsuya Honda, Shiki; Hidenori Suzuki, Fujimi, both of Japan

[73] Assignee: Kabushiki Kaisha, Japan

[21] Appl. No.: 454,766

[22] Filed: Dec. 21, 1989

[30] Foreign Application Priority Data

Dec. 27, 1988 [JP] Japan .............. 63-168721[U]
Dec. 27, 1988 [JP] Japan .................. 63-330701

[51] Int. Cl.$^5$ .................. G06K 13/00; G11B 19/20
[52] U.S. Cl. .................. 369/258; 360/2; 235/475; 235/479; 369/215
[58] Field of Search ............ 369/250, 215, 219, 244, 369/176; 360/69, 104, 71, 105, 106, 73.01, 73.04, 74.1, 88, 97.01, 99.06, 99.07, 2; 235/435, 475, 483, 485, 479, 486, 480

[56] References Cited

U.S. PATENT DOCUMENTS

| | | | |
|---|---|---|---|
| 4,800,258 | 1/1989 | Suzuki et al. | 235/479 |
| 4,871,905 | 10/1989 | Mita et al. | 235/475 |
| 4,907,098 | 3/1990 | Ohkoda et al. | 360/2 |
| 4,926,033 | 5/1990 | Kobayashi | 235/475 |
| 4,935,916 | 6/1990 | Suzuki | 235/479 X |

FOREIGN PATENT DOCUMENTS

| | | |
|---|---|---|
| 61-283066 | 12/1986 | Japan . |
| 62-75887 | 4/1987 | Japan . |
| 62-92275 | 4/1987 | Japan . |
| 62-92277 | 4/1987 | Japan . |
| 62-102474 | 5/1987 | Japan . |

Primary Examiner—Stuart S. Levy
Assistant Examiner—Joseph A. Rhoa
Attorney, Agent, or Firm—Welsh & Katz, Ltd.

[57] ABSTRACT

A card carrier in use with an optical data record/reproduction system for reading data from and writing data to a card, including a press contact slide member (26, 27) which prevents a table for carrying the card from being tilted and deviated from a predetermined traveling direction, and a table drive member which prevents the transfer of a vibration to the table. With this arrangement, data is exactly written into and read out from the card.

4 Claims, 6 Drawing Sheets

PRIOR ART

PRIOR ART

CARD CARRIER

BACKGROUND OF THE INVENTION

The present invention generally relates to a data record/reproduction system for reading out data from a card or writing data into the card. More particularly, the present invention relates to a card carrier in use with an optical data record/reproduction system using an optical card as a card.

There is a proposal of an optical card as a recording medium for an optical data record/reproduction system of the type in which a light beam (laser beam) is used for the read/write of data.

In the optical data record/reproduction system, to write data into the optical card or read out data from the card, the card must be moved relative to an optical read/write head. In this respect, a card carrier 1 as perspectively illustrated in FIG. 7 has been proposed for the optical data record/reproduction system using an optical card.

The card carrier 1 is made up of a pair of parallel guide rods 2 and 3 which are spaced from each other by a predetermined distance, and a table 4 reciprocatingly moving along the paired guide rods 2 and 3. An optical card 5 is set to and supported by the table 4, and the card, together with the table 4, is reciprocatingly moved in the direction of arrow A.

A pair of parallel support members 6 and 7 are fastened to the lower surface of the table 4. The support member 6 has a pair of through holes 6a through which the guide rods 2 and 3 are passed. Similarly, the support member 7 has a pair of through holes 7a through which the same rods are passed.

The table 4 is reciprocatingly moved in the guide rod extending direction (of arrow A) by a table drive means 14, which is constructed with a rack 11 fixed to the lower surface of the table 4, a pinion 12 in mesh with the rack 11, a motor 13 to drive the pinion 12, and the like.

An optical head 8 is arranged in parallel to a phantom plane containing the pair of guide rods 2 and 3 of the table 4. The head 8 is further supported by a guide rod 9 oriented orthogonal to the extension of the guide rods 2 and 3. The optical head 8 is reciprocatingly moved along the guide rod 9 in the direction (of arrow B) orthogonal to the moving direction of the table 4, by means of a drive means constructed with a worm 10.

The optical head 8 scans a memory area 5a on the upper surface of the optical card 5 through the combination of the reciprocating motions of the table 4 and the head 8 whose directions are orthogonal to each other, thereby to read out data from and write data into the memory area 5a.

A record width (track pitch) of a data unit (pit) of the data to be recorded in the record area 5a of the card 5 is very narrow, approximately 10 to 12 μm. A high accuracy of positioning the table 4 relative to the head 8 that is performed in read and write modes, is required.

In the card carrier 1 as mentioned above, as shown in FIG. 8 showing a sectional view of a key portion of the mechanism of FIG. 7, the guide rods 2 and 3 are passed through those holes 6a and 7a and must be smoothly moved therethrough. To this end, a diameter L of each of the through holes 6a and 7a of the support members 6 and 7, which are fixed to the lower surface of the table 4, is slightly larger than a diameter "l" of each of the guide rods 2 and 3, within a tolerable range. Therefore, a play due to the diameter difference essentially exists between the holes 6a and 7a and the guide rods 2 and 3.

When a vibration externally applied and a vibration originating from a drive system are applied to the card carrier involving such a play in the transport mechanism including the guide rods 2 and 3 and the through holes 6a and 7a, the table 4 is possibly tilted vertically with respect to the extension of the guide rods 2 and 3 within a range of the play, as shown in FIGS. 9 and 10.

Further, the table 4 may be tilted horizontally with respect to the extension of the guide rods 2 and 3 within a range of the play, as shown in FIGS. 11 and 12 showing sectional views of a key portion of the mechanism of FIG. 7. Those tilts of the table 4 degrades an accuracy of the relative positioning of the table 4 and the head 8, thereby to make it impossible for the head 8 to exactly read out data from and write data into the memory area.

In the card carrier 1 shown in FIG. 7, the table drive means 14 is constructed with a rack-pinion mechanism inherently suffering from a backlash, which includes the rack 11 and the pinion 12. Because of the backlash, a vibration tends to occur in the table drive means 14 particularly when the motor 13 starts and stops. A vibration generated in the drive means 14 is transferred through the rack 11 to the table 4. Consequently, the relative positioning accuracy of the table 4 and the head 8 is degraded, thereby to make it impossible for the head 8 to exactly read out data from and write data into the memory area.

SUMMARY OF THE INVENTION

Accordingly, an object of the present invention is to provide a card carrier which minimizes an orientation of a table to travel a card that is deviated from a predetermined traveling direction of the table.

Another object of the present invention is to provide a card carrier which can transfer the smallest possible vibration to a table to travel a card.

To achieve the above objects, there is provided a card carrier having a table for carrying a card, a hole formed in the table, a guide rod inserted through the hole, and table drive means to reciprocatingly move the table along the guide rod, in which a pair of rods are arranged oppositely with respect to the guide rod, and extend in the same direction as that of the extension of the guide rod, and press contact slide means is arranged on the table, one end of the press contact slide means is pressed against one of the pair of rods, while the other end is pressed against the other of the pair of rods; and in which the table drive means comprises a belt made of resilient material stretched across the table in the longitudinal direction of the guide rod, a drive shaft disposed adjacent to one side of the belt, a pinch roller disposed adjacent to the other side of the belt and in opposition to the drive shaft with respect to belt, the pinch roller being allowed to touch and detach from the other side of the belt, and roller touch/detach means for touching the pinch roller and detaching the pinch roller from the other side of the belt.

Other objects, features, and advantages of the present invention will be apparent from the following description taken in connection with the accompanying drawings, in which:

DETAILED DESCRIPTION OF THE PREFERRED EMBODIMENT

A preferred embodiment of a card carrier according to the present invention will be described in detail with reference to the accompanying drawings.

Figure 1:
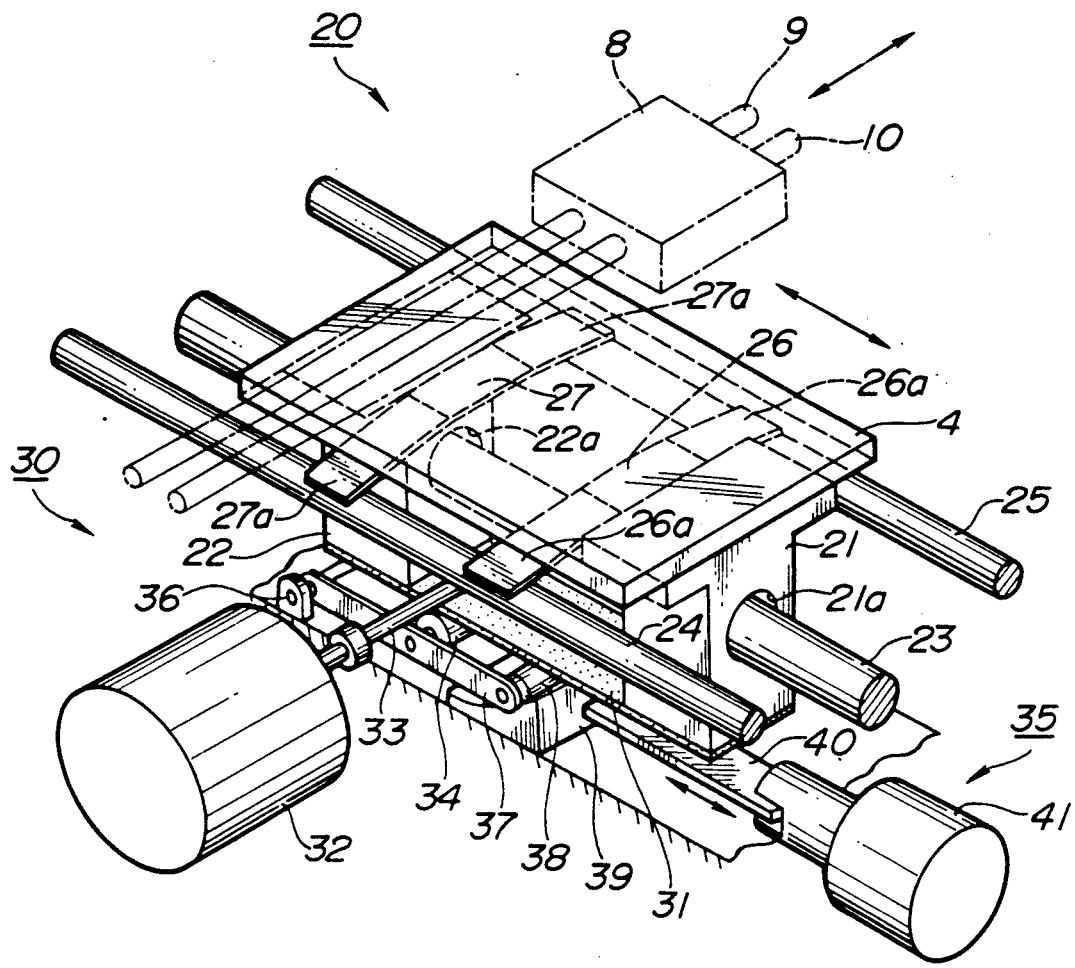
FIG. 1 shows a perspective view of a card carrier according to the present invention.

FIG. 1 shows a perspective view of a card carrier 20 according to the present invention. In the figure, like or equivalent portions are designated by like reference symbols in FIG. 7.

In the card carrier 20, a pair of support members 21 and 22 are fixed to the lower surfaces of the leading and trailing ends of a table 4, which are located at the center of the table 4 as viewed in the longitudinal direction of the table 4. The support members 21 and 22 have through holes 21a and 22a which extends along a line passing through the center of the table 4 as viewed in the longitudinal direction. A single guide rod 23 is inserted through the holes 21a and 22a, and guides the table 4 to one side in the longitudinal direction of the table.

A pair of slide rods 24 and 25 are placed at the positions symmetrically with respect to the rod 23. The slide rods 24 and 25 are each spaced from the guide rod 23 by a predetermined distance, and extend in parallel to the rod 23 and in the same direction as that of the extension of the guide rod 23. Press contact slide means are respectively fixed to the leading end portion and the trailing end portion of the lower surface of the table 4. The press contact slide means are constructed with plate springs 26 and 27. The lower surfaces of both ends 26a of the spring 26 are constantly pressed against the upper surfaces of the slide rods 24 and 25, respectively. The same thing is true for both the ends 27a of the spring 27.

Figure 7:
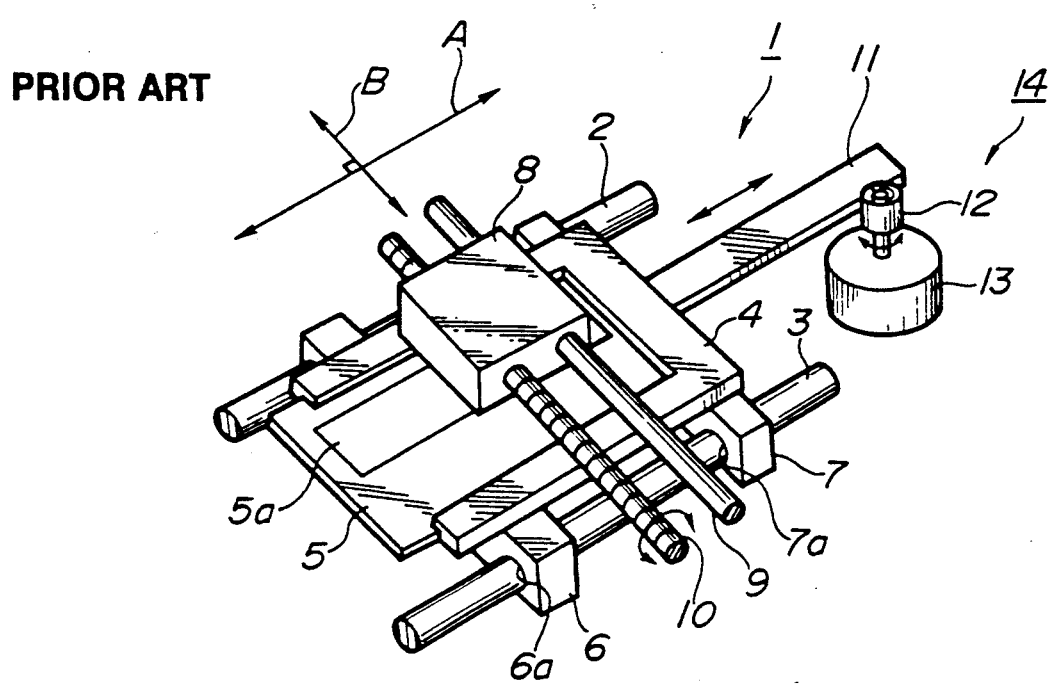
FIG. 7 shows a perspective view of a card carrier of prior art.
Figure 8:
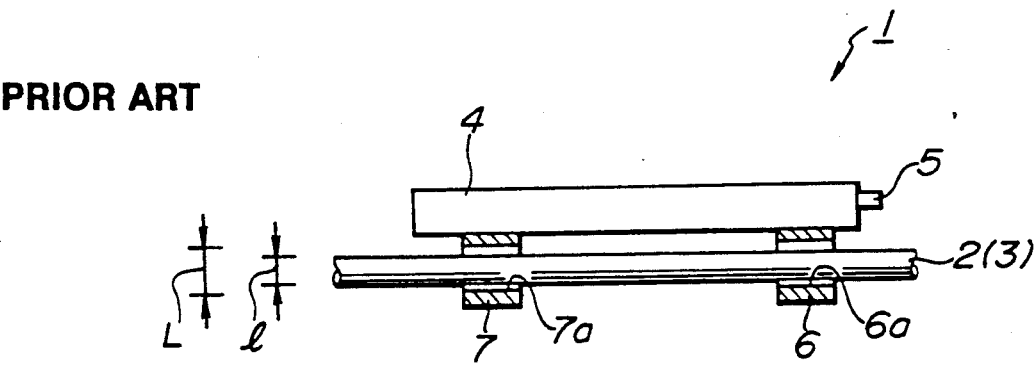
FIGS. 8 through 12 show longitudinal sectional views of a key portion of the mechanism of FIG. 7.
Figure 9:
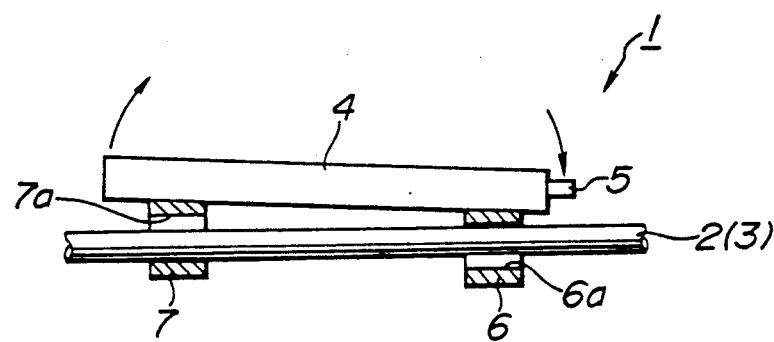
Figure 10:
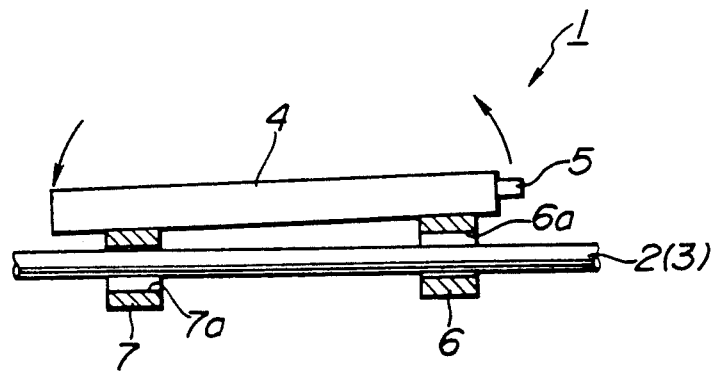
Figure 11:
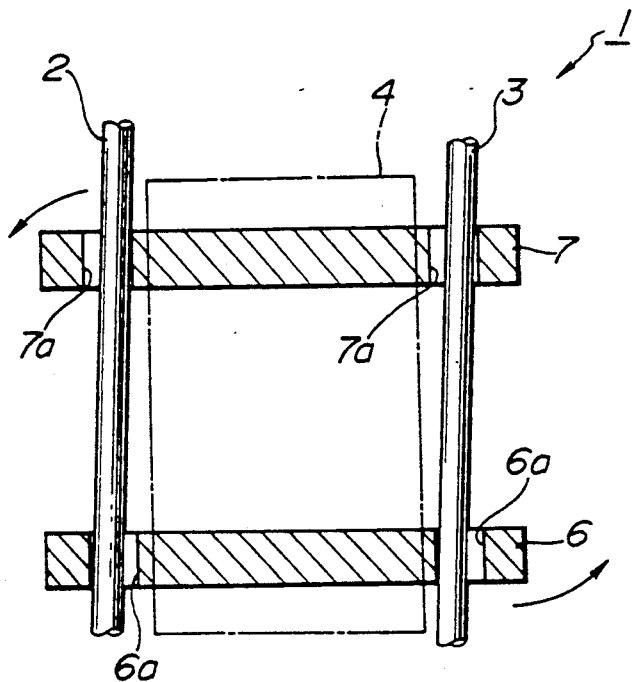
Figure 12:
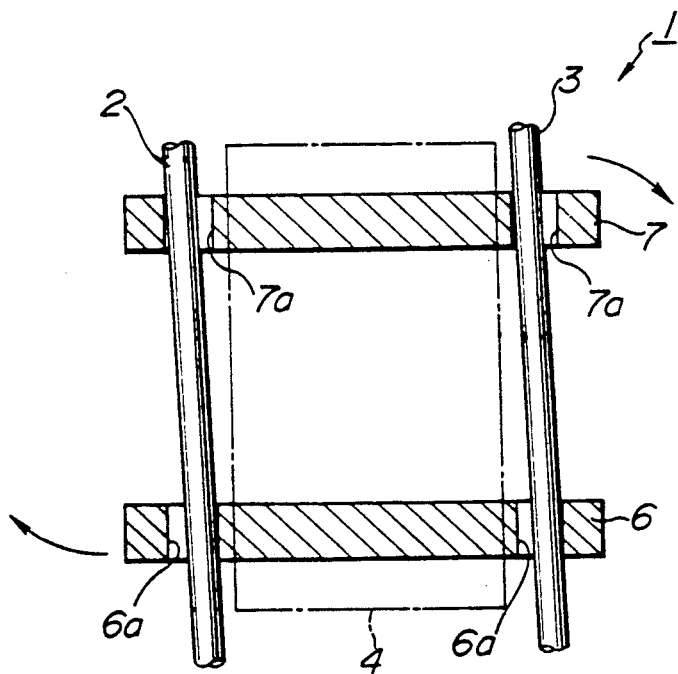

As a matter of course, an optical card, a holder for holding the card, and the like, although not shown, are arranged on the upper surface of the table 4, as in the prior apparatus of FIG. 7.

A table drive means 30 for reciprocatingly moving the table 4 along the guide rod 23 comprises a belt 31 made of resilient material, a drive shaft 33, a pinch roller 34, and roller touch/detach means 35. The belt 31 is stretched between the lower surfaces of the pair of the support members 21 and 22. The drive shaft 33 is disposed adjacent to the upper surface of the belt 31, and is turned by a motor 32. The pinch roller 34 is adjacent to the lower surface of the belt 31, and disposed in opposition to the drive shaft 33 with respect to the belt. The roller 34 is may be made to touch and to detach from the lower surface of the belt 31. The touch/detach means 35 presses the pinch roller 34 against the lower surface of the belt 31, when the table 4 travels. When the table 4 rests, the means 35 detach the pinch roller 34 from the lower surface of the belt.

The pinch roller 34 is rotatably supported at substantially the center of each of paired arms 37. Each arm 37 is supported at and swingable about an axis 36. A roller 38 is rotatably mounted to the free end of the arm 37. The roller touch/detach means 35 includes a slider 39 and a solenoid plunger 41. The upper surface of the slider 39, which is shaped arcuate, is slidably set under the lower surface of the roller 38. The plunger 41, coupled with an operation bar 40, moves the slider 39 in the direction in which the guide rod 23 extends.

An operation of the table drive means 30 will be described.

Figure 2:
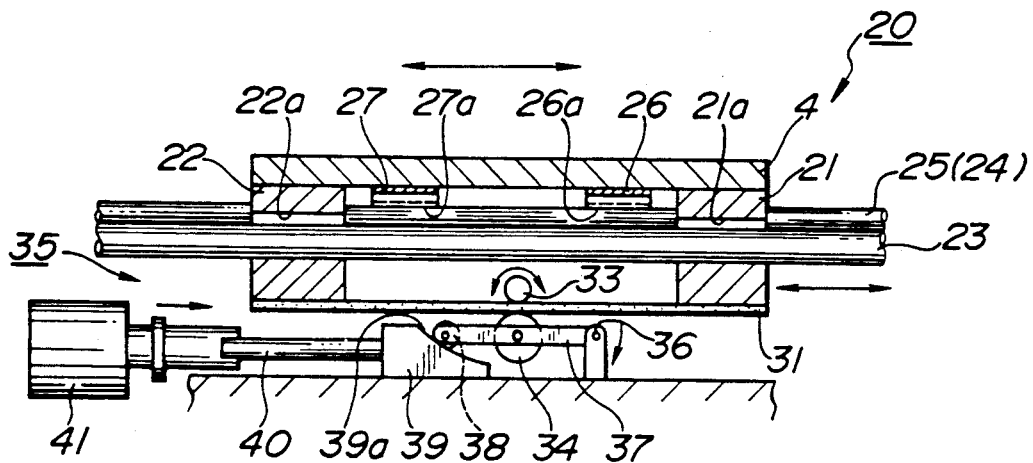
FIGS. 2 and 3 show longitudinal sectional views of a key portion of the mechanism of FIG. 1.

As shown in FIG. 2 showing a longitudinal sectional view of a key portion of the mechanism of FIG. 1, in a table travel mode in which the table 4 travels, the slider 39 is slid to the right as viewed in the drawing with the plunger 41 of the roller touch/detach means 35. Then, the roller 38 supported at the free end of the arm 37 which supports the pinch roller 34 is swung clockwise about the axis 36 along the arcuate upper surface 39a of the slider 39. Accordingly, the pinch roller 34 supported by the arm 37 is moved upward and is pressed against the lower surface of the belt 31. Thus, when the pinch roller 34 is moved upward and comes in press contact with the lower surface of the belt 31, the resilient belt 31 is nipped between the drive shaft 33 and the pinch roller 34. Under this condition, if the drive shaft 33 turns clockwise and counterclockwise, the table 4 reciprocatingly travels in the direction in which the guide rod 23 extends. When the table 4 reciprocatingly travels, if a vibration occurs in the drive shaft 33 and the pinch roller 34, the vibration is absorbed by the resilient belt 31, and the vibration transferred to the table 4 is minimized.

As seen from the foregoing description, in the table drive means 30, the vibration generated in the table drive means is absorbed by the resilient belt 31 to be minimized. Therefore, the positioning of the read/write head relative to the table, that is, the head relative to the memory area of the card, can be carried out with high precision. Therefore, there is eliminated an improper read/write operation by the head. The resultant card carrier is capable of exactly recording and reproducing data to and from the card.

Figure 3:
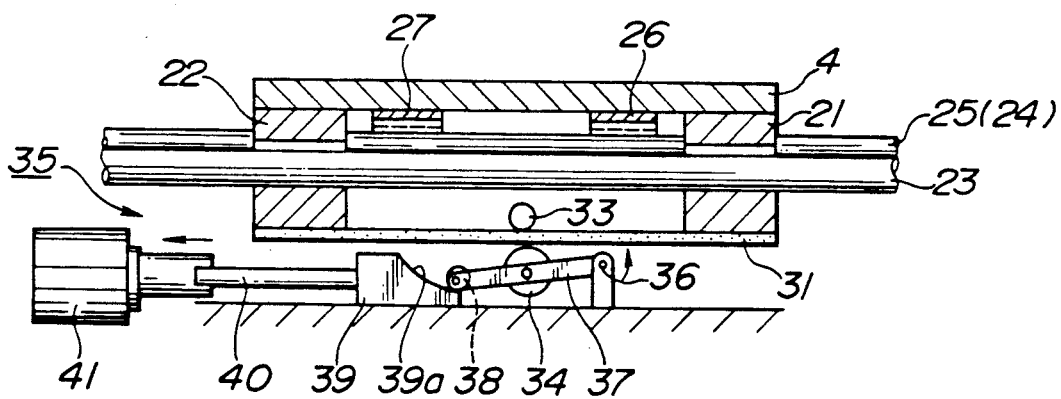

As shown in FIG. 3 showing a longitudinal sectional view of a key portion of the mechanism of FIG. 1, in a table rest mode in which the table 4 rests, the slider 39 is slid to the left as viewed in the drawing with the plunger 41 of the touch/detach means 35. Then, the roller 38 supported at the free end of the arm 37 which supports the pinch roller 34 is swung counterclockwise about the axis 36 along the arcuate upper surface 39a of the slider 39. Accordingly, the pinch roller 34 supported by the arm 37 is moved downward and detaches from the lower surface of the belt 31. Accordingly, under this condition, if the drive shaft 33 turns, the table 4 will not reciprocatingly travel.

In the table drive means 30 using the resilient belt 31, if the belt 31 is constantly nipped by the drive shaft 33 and the pinch roller 34, the belt 31 becomes sticked on the shaft 33 and the roller 34 due to their aging. Under this condition, if the table 4 is driven to move, there is the possibility that a vibration is generated in the belt 31 at the time of start and during the traveling of the table. In the present embodiment, however, the roller touch/detach means 35 is used, and in the rest mode, it detaches the belt 31 from the drive shaft 33 and the pinch roller 34. Accordingly, the card carrier of the present embodiment is free from the problem that the aging causes the belt 31 to stick on the drive shaft 33 and the pinch roller 34, and hence is free from the vibration of the belt which is caused by the sticking of the components.

An operation of the card carrier 20 as described above and its detailed structure will be described in detail.

Figure 4:
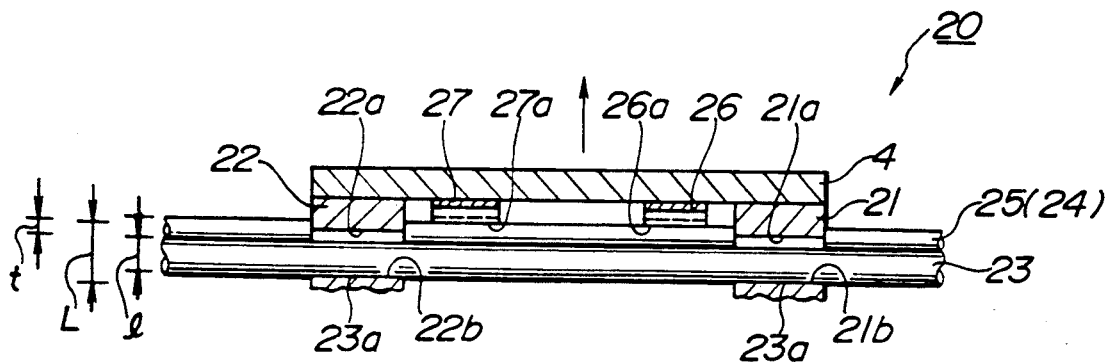
FIG. 4 shows a longitudinal sectional view of a key portion of the mechanism of FIG. 1.

As shown in FIG. 4 showing a longitudinal sectional view of a key portion of the mechanism shown in FIG. 1, the guide rod 23 is passed through those holes 21a and 22a and must be smoothly moved therethrough. To this end, a diameter L of each of the through holes 21a and 22a of the support members 21 and 22, which are fixed to the lower surface of the table 4, is slightly larger than a diameter "l" of the guide rod 23, within a tolerable range. Therefore, a play "t" due to the diameter difference essentially exists between the holes 21a and 22a and the guide rod 23.

As recalled, the plate springs 26 and 27 as the press contact slide means are fixed to the lower surface of the table 4, and both end portions 26a and 27a of the plate springs 26 and 27 are pressed against the upper surfaces of the slide rods 24 and 25. With such a structure, the plate springs 26 and 27 push up the table 4 relative to the guide rod 23. Accordingly, a specific portion of the guide rod 23, i.e., a bottom side 23a of the rod 23, is constantly in press contact with specific portions of the holes 21a and 22a, i.e., bottom inner surfaces 21b and 22b of the holes 21a and 22a.

Figure 5:
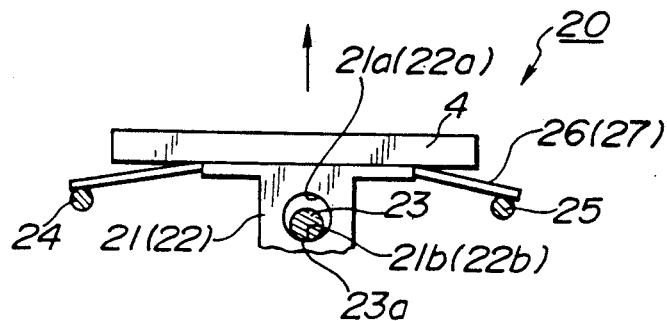
FIG. 5 shows a sectional view of a key portion of the structure illustrated in FIG. 4.
Figure 6:
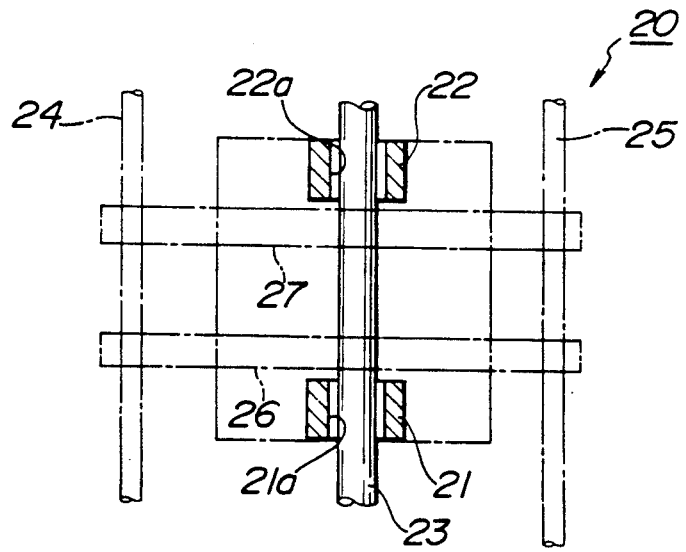
FIG. 6 shows a plan view of a key portion of the structure illustrated in FIG. 4.

Consider a case that the table 4 is being moved along the guide rod 23, and a vibration from external vibration sources including the drive system is applied to the card carrier. In this case, the vibration acts to cause the table 4 to tilt within the play "t" existing between the guide rod 23 and the holes 21a and 22a (FIG. 4). However, it fails to tilt the table 4, because the pressure by the springs 26 and 27 as the press contact slide means forcibly sets the table 4 at such a reference position where the bottom side 23a of the rod 23 is constantly in press contact with the bottom inner surfaces 21b and 22b of the holes 21a and 22a. If the vibration tilts the table 4 from the reference position, the pressure by the springs 26 and 27 as the press contact slide means forcibly returns the table 4 to the reference position where the bottom side 23a of the rod 23 is in press contact with the bottom inner surfaces 21b and 22b of the holes 21a and 22a, as shown in FIGS. 5 and 6 showing a plan sectional view of the mechanism shown in FIG. 5.

In the above-mentioned embodiment, two plate springs are used as the press contact slide means, but a single plate spring or more than two plate springs may be used, if necessary. Further, a plurality of guide rods may be used in place of the single guide rod 23. Additionally, the present invention is applicable for a magnetic card carrier in use with a data record/reproduction system using a magnetic head for reading data from and writing data into the magnetic card.

As seen from the foregoing description, in the card carrier, the table for carrying the card, which travels along the guide rod, is set at the reference position where it is pressed against the specific portion of the guide rod. Under this condition, the table is moved. Therefore, there is little possibility that the table is tilted and deviated from a predetermined traveling direction of the table. Therefore, the positioning of the read/write head relative to the table, that is, the head relative to the memory area of the card, can be carried out with a high precision. Therefore, there is eliminated an improper read/write operation by the head. The resultant card carrier is capable of exactly recording and reproducing data to and from the card.

Having described a specific embodiment of our bearing, it should be understood that the present invention may variously be changed and modified within the spirit and scope as set forth in the appended claims. It is further understood that the variations and modifications within the equivalents of the invention as defined in the claims are also within the spirit and scope of the invention.

What is claimed is:

1. A card carrier having a table for carrying a card, a hole formed in said table, a guide rod inserted through said hole, said guide rod having an extension extending in one direction, and table drive means for reciprocatedly moving said table along said guide rod, wherein a pair of rods are arranged oppositely with respect to said guide rod and extended in the same direction as that of said extension of said guide rod, and press contact slide means disposed on said table, one end of said press contact slide means being pressed against one of said pair of rods, while the other end being pressed against the other one of said pair of rods, and wherein said table drive means comprises:

a belt made of resilient material stretched across said table in the longitudinal direction of said guide rod, a drive shaft disposed adjacent to one side of said belt, a pinch roller disposed adjacent to the other side of said belt and in opposition to said drive shaft with respect to said belt, said pinch roller being allowed to touch and detach from the other side of said belt, and a roller touch/detach means for touching said pinch roller to the other side of said belt and detaching said pinch roller from the other side of said belt.

2. The card carrier according to claim 1, in which said press contact slide means is a plate spring.

3. The card carrier according to claim 1, in which said card is an optical card used as a recording medium of an optical data record/reproduction system which uses a laser beam for reading and writing data.

4. The card carrier according to claim 1, in which said card is a magnetic card used as a recording medium of a data record/reproduction system which uses a magnetic head for reading and writing data.

* * * * *